United States Patent [19]
Brown et al.

[11] 4,247,151
[45] Jan. 27, 1981

[54] WHEEL COVER RETENTION

[75] Inventors: Trevor J. Brown, Rochester; Neal S. Hakken, Mt. Clemens, both of Mich.

[73] Assignee: General Motors Corporation, Detroit, Mich.

[21] Appl. No.: 101,289

[22] Filed: Dec. 7, 1979

[51] Int. Cl.³ ............................................. B60B 7/00
[52] U.S. Cl. ............................... 301/37 R; 301/37 P; 24/73 HC
[58] Field of Search ............... 301/37 R, 37 P, 37 TP, 301/37 PB, 37 B, 108 R, 108 A; 24/73 HC, 73 B

[56] References Cited

U.S. PATENT DOCUMENTS

| | | | |
|---|---|---|---|
| 2,698,203 | 12/1954 | Landell | 301/37 R |
| 3,199,921 | 8/1965 | Boroday et al. | 301/37 R |
| 3,425,747 | 2/1969 | Alfes et al. | 301/37 R |
| 3,970,346 | 7/1976 | Kretschmer | 301/37 P |

Primary Examiner—H. Grant Skaggs
Attorney, Agent, or Firm—Herbert Furman

[57] ABSTRACT

A vehicle wheel cover is retained on a vehicle wheel by a plurality of cantilever type retainers having teeth which engage both a flange of the wheel and the tire bead seat. The retainers are removably attached to the cover body and are pre-shaped to a slightly arcuate configuration prior to assembly of the cover to the wheel to provide for ease of assembly together with low stress and a high load.

4 Claims, 4 Drawing Figures

WHEEL COVER RETENTION

This invention relates generally to vehicle wheel covers and more particularly to an improved wheel cover retention for self-retaining plastic wheel covers on a vehicle wheel by cantilever type retainers.

Cantilever type retainers for self-retaining a metal wheel cover on a vehicle wheel are shown in Landell U.S. Pat. Nos. 2,698,203, Boroday et al 3,199,921, and Alfes et al 3,425,747. However, such prior art structures are not suitable for plastic wheel covers inasmuch as the retainers must be riveted to the metal wheel cover.

The retention of this invention includes a cantilever type retainer which is removably attached to the cover and fixed against rotation relative thereto during assembly of the cover to the wheel. The retainer is also preloaded by the cover into a configuration which facilitates assembly of the cover to the wheel and maintains a low spring rate, low stress and high load after assembly. In its preferred embodiment, the retainer is removably attached to the cover body by radially spaced integral flanges of the cover which receive the body of the retainer therebetween, with the body seating on one of the flanges and having an integral locking portion removably engageable with the other flange to secure the retainer in place. The cover also includes circumferentially spaced integral locating means engageable by the respective cantilever legs of the retainer to preshape such legs to a slightly arcuate shape from their normal planar shape to facilitate assembly of the cover to the wheel. The locating means cooperate with the legs and the spaced flanges cooperate with the locking portion to provide an anti-rotation feature and ensure that no rotation of the retainer relative to the cover occurs when the cover is assembled to the wheel. The terminal ends of the cantilever legs are each provided with a pair of integral axially spaced differential length radial teeth, with the longer tooth of each leg seating in the tire bead of the wheel rim and the shorter tooth engaging the adjacent axial flange of the wheel rim.

One of the features of this invention is that it provides an improved wheel cover retention for self-retaining plastic wheel covers on a wheel. Another feature is that the retention includes a cantilever type retainer which is removably secured to the cover by cooperating integral means of the retainer and of the cover. A further feature is that the retainer has a body portion interlocked with integral flange means of the cover and a pair of oppositely extending cantilever legs which are pre-shaped by integral locating means of the cover to reduce the force required to deflect such legs upon engagement of the legs with a retention flange of the wheel. Yet another feature is that the flange means of the cover includes radially spaced flanges, with the retainer body portion seating on the radial inner flange and having an integral return bent locking portion which is removably engageable with the radially outer flange to thereby removably lock the retainer to the cover with the radially outer flange means interlocking with the side edges of the locking portion for anti-rotation purposes. Yet a further feature is that the locating means includes a plurality of circumferentially spaced axial ribs to each side of the radially outer flange for engagement with the cantilever legs of the retainer to thereby pre-shape such legs to a slightly arcuate configuration approximating the arcuate configuration of the retention flange of the wheel. Still another feature is that the cover flanges and cover ribs cooperate with the retainer to resist rotation of the retainer relative to the cover during cover assembly to the wheel.

These and other features of this invention will be readily apparent from the following specification and drawing wherein.

Figure 1:
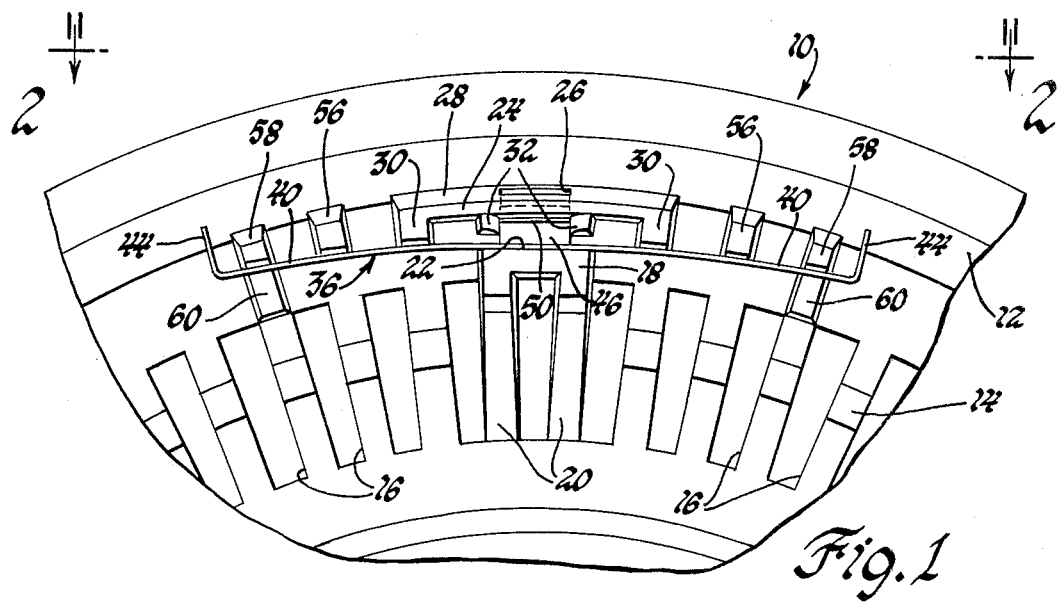
FIG. 1 is a partial rear elevation view of a wheel cover retention according to this invention.
Figure 2:
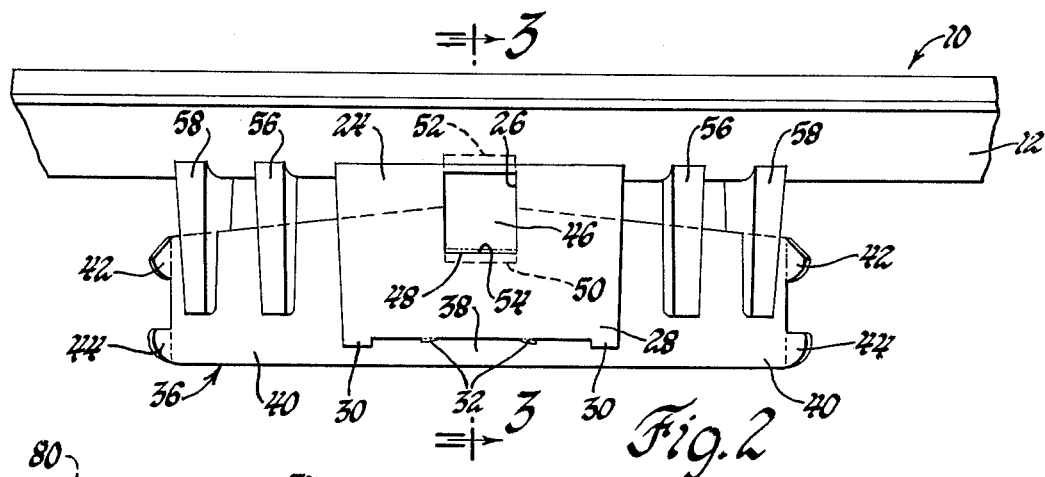
FIG. 2 is a partial plan view taken generally along the plane indicated by line 2—2 of FIG. 1.

Referring now to the drawings, a disc type vehicle wheel cover designated generally 10 is formed of molded plastic material. The other peripheral area 12 of the cover includes a radially offset portion 14 having a plurality of radially elongated radially offset openings 16. Area 14 and openings 16 are part of the cover design and are not necessary to this invention.

The cover 10 is generally retained to a vehicle wheel by a retention according to this invention which includes four like cantilever type retainers which are spaced equally about the periphery of the cover for engagement with the wheel. Since the retainers and the support structure for the retainers on the cover is the same, only one will be particularly described. An axially extending radially inner flange 18 is formed integral with the area 14 of the cover and includes a pair of integral radially inwardly extending tapered legs 20 which support the flange 18 against radial movement. As shown in FIG. 1, the legs 20 generally straddle one of the openings 16 so that both the legs and the flange 18 are invisible from the outer surface of the cover. The radially outer surface 22 of the flange 18 is slightly curved circumferentially of the cover.

An axially extending radially outer flange 24 is likewise formed integral with the cover 10 and is radially spaced outwardly of flange 18. The flange 24 includes a generally rectangular radially opening slot or opening 26. The radially outer surface 28 of flange 24 is arcuate circumferentially of the cover and tapered axially of the cover. The flange 24 includes spaced pairs of circumferentially spaced pairs of integral radially inwardly extending ribs 30 and 32. The ribs 30 extend from the circumferential sides of flange 24. The ribs 32 are of less radial extent than the ribs 30 and are located to each side of the opening 26. Both ribs extend axially to the area 12. As shown in FIG. 1, the ribs 30 and 32 taper axially of the cover.

Figure 4:
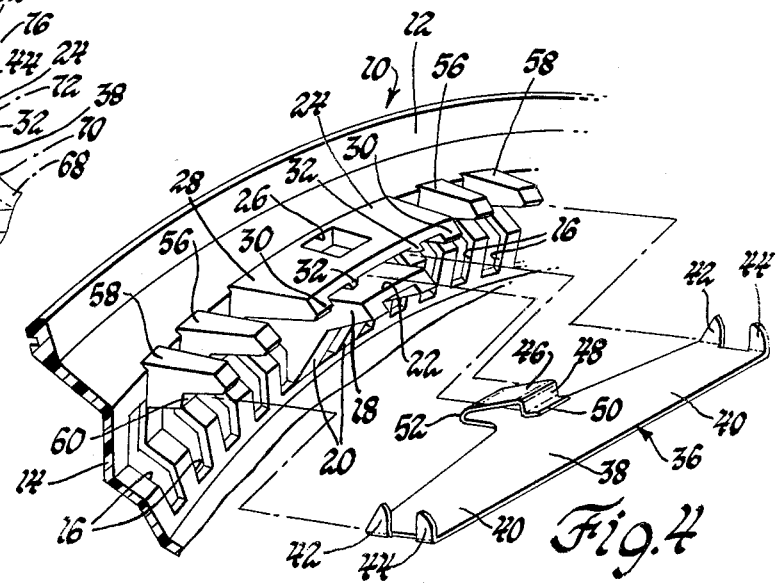
FIG. 4 is a perspective view.

A retainer 36, best shown in FIG. 4, of spring steel includes a body portion 38 and a pair of like cantilever legs 40 extending to opposite sides of the body portion and coplanar therewith. Each of the cantilever legs terminates in a pair of lateral teeth 42 and 44 for radially resilient gripping engagement with the wheel as will be described. The body portion further includes a return bent locking portion 46 terminating in an offset flange portion including a first lateral flange 48 and a second lateral terminal flange 50.

Figure 3:
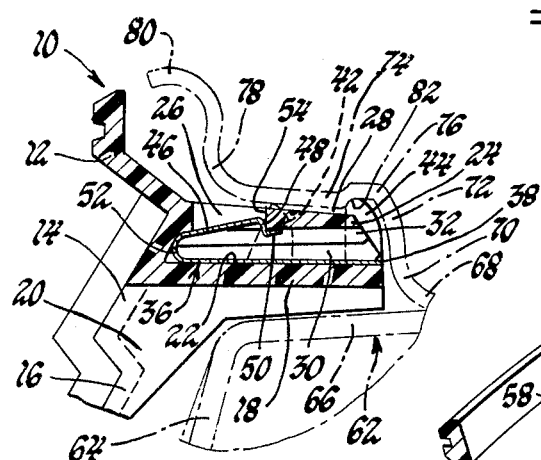
FIG. 3 is a view taken generally along the plane indicated by line 3—3 of FIG. 2 and showing the cover assembled to a vehicle wheel.

The retainer 36 is inserted between the flanges 18 and 24, with the body portion 38 seating on the outer surface 22 of the flange 18. The arcuate shoulder 52 of the return bent portion 46 seats against the peripheral area 12 of the cover 10 and underneath flange 24, as shown in FIG. 3. The flange 48 engages the end wall 54 of opening 26 and the flange 50 underlies the flange 24 to thereby removably lock the retainer 36 in place between the flanges 18 and 24. The ribs 32 engage the side edges of the return bent leg of the locking portion 46 to resist rotation of the retainer 36 relative to the flanges 18 and 24.

The cover further includes, to each side of a flange 24, a circumferentially spaced pair of axially inwardly extending ribs 56 and 58 which are formed integral with the cover 10. The radially outer surfaces of the ribs are arcuate circumferentially of the cover and slightly tapered axially of the cover as shown in FIG. 1. The ribs 58 each have an integral radially inwardly extending bearing portion 60, FIGS. 1 and 4, which engages the axially outer edge of a respective leg 40 of retainer 36.

The retainer 36 is generally planar when formed as previously mentioned. When the retainer 36 is inserted between flanges 18 and 24, the cantilever legs 40 of the retainer each engage the radially inner surfaces of ribs 30, 56 and 58 as shown in FIG. 1. Such surfaces are formed on a predetermined slight arc circumferentially of the cover to slightly deflect or shape a respective leg of the retainer to a generally arcuate configuration, and thereby preload each leg. The teeth 42 and 44 of each leg are thereby also positioned radially inwardly of their free shape position.

A conventional vehicle wheel designated generally 62 is diagrammatically shown in FIG. 3. This wheel includes an annular hub portion 64 provided with a circumferential flange or skirt 66 which is welded or riveted in a conventional manner to the drop center flange 68 of a rim 70. The rim 70 includes a generally radially extending flange 72 which merges into a radially inwardly facing axially outwardly extending flange 74 across what is commonly known as a tire bead 76. The flange 74 merges across an arcuate juncture 78 into a radially extending terminal flange 80. The wheel 62 is conventional and has been used on production vehicles for many years.

When cover 10 with the assembled retainers 36 is mounted on the wheel 62, the cover is generally centered with respect to the wheel opening defined by the flanges 66 and 74 and pushed axially inwardly of the wheel. The radially inner surface of the flange 18 and the radially outer surface of flange 24 are respectively juxtaposed to such wheel flanges and slightly spaced therefrom as shown in FIG. 3. The initial engagement of the teeth 44 of the cantilever legs 40 with the arcuate juncture 78 deflects the legs further radially inwardly with respect to the body portion 38 and maintains this deflection as the teeth 44 slide axially inwardly of the flange 74 and the teeth 42 remain spaced from such flange. When the teeth 44 move past the flange 74, the inherent resiliency of the cantilever legs springs the legs radially outwardly and engages the teeth 44 within the groove 82 defined by the tire bead 76. Simultaneously, the teeth 42 move radially outwardly into biting engagement with the flange 74. The engagement of teeth 44 with the groove 82 provide an interference lock while the engagement of teeth 42 with flange 74 provide a biting engagement lock. Both teeth 42 and 44 of each leg are equally loaded when the cover is assembled to the wheel.

By pre-shaping the retainer 36 from its normal planar shape to its slightly arcuate shape shown in FIG. 1 before assembly of the cover to the wheel, the interference between the teeth 44 and the arcuate juncture 78 is preset to provide for ease of assembly while maintaining the retainer at low spring rate and low stress and under a high load. If the retainer was not so pre-shaped, it would be extremely difficult to assemble the cover to the wheel due to the interference between the teeth 44 and the arcuate juncture 78 and both the spring rate and stress would greatly increase.

During the assembly of the cover to the wheel, the bearing portions 60 of ribs 58 remain in sliding engagement with the axial outer edges of the cantilever legs at all times and thus cooperate with the ribs 32 in resisting any rotation of the retainer 36 relative to the cover. Once the cover is mounted on the wheel, the cantilever legs are located radially inwardly of or out of engagement with the radially inner surfaces of the ribs 30, 56 and 58 whereby the cover is resiliently floated on the wheel by the retainers.

Thus this invention provides an improved vehicle wheel cover retention.

The embodiments of the invention in which an exclusive property or privilege is claimed are defined as follows:

1. In combination with a vehicle wheel, a wheel cover comprising, a cover body having a pair of circumferentially extending radially spaced flange means spaced relative to each other, a wheel cover retainer insertable between the flange means and including a body portion seating on one flange means and a locking portion removably engageable with the other flange means to removably secure the retainer to the flange means, anti-rotation means on one of the flange means engageable with the locking portion to resist rotation of the retainer relative to the cover, the retainer including a pair of cantilever legs, each extending from a circumferentially respective side of the body portion, means on the terminal portion of each leg engageable with the wheel to retain the cover thereon, locating means on the cover engageable by the legs to deflect the legs radially inwardly to predetermined shape and position the terminal portions of the legs in interfering relationship to the wheel in the uninstalled positon of the cover, the engagement of the terminal portions with the wheel upon installation of the cover deflecting the legs further radially inwardly and out of engagement with the locating means to a resilient cantilever position to resiliently retain the cover on the wheel, and means on the cover body axially backing up the legs upon installation of the cover and further radial deflection thereof.

2. In combination with a vehicle wheel, a wheel cover comprising, a cover body having a pair of circumferentially extending radially spaced flange means spaced relative to each other, a wheel cover retainer insertable between the flange means and including a body portion seating on one flange means and a locking portion removably engageable with the other flange means to removably secure the retainer to the flange means, anti-rotation means on one of the flange means engageable with the locking portion to resist rotation of the retainer relative to the cover, the retainer including a pair of cantilever legs, each extending from a circumferentially respective side of the body portion, means on the terminal portion of each leg engageable with the wheel to retain the cover on the wheel, axial rib means on the cover engageable by the legs to deflect the legs radially inwardly to predetermined shape and position the terminal portions of the legs in interfering relationship to the wheel in the uninstalled position of the cover, the engagement of the terminal portions with the flange upon installation of the cover deflecting the legs further radially inwardly and out of engagement with the axial rib means to a resilient cantilever position to resiliently retain the cover on the wheel, and radial rib means on the cover body axially engageable by the legs to axially back up the legs upon installation of the cover and further radial deflection thereof.

3. In combination with a vehicle wheel having an annular axially extending flange and a tire bead, a wheel cover comprising, a cover body having a pair of axially extending radially spaced flange means, a wheel cover retainer insertable between the flange means and including a body portion seating on one flange means and a locking portion removably engageable with the other flange means to removably secure the retainer to the flange means, the retainer including a pair of cantilever legs, each extending from a circumferentially respective side of the body portion, the terminal portion of each leg including a radially extending locking tooth and an axially spaced biting tooth respectively engageable with the tire bead and with the wheel flange to retain the cover on the wheel, locating means on the cover engageable by the legs to deflect such legs radially inwardly and position the locking teeth of the legs in interfering relationship to the wheel flange in the uninstalled position of the cover, the engagement of the locking teeth with the wheel flange upon installation of the cover deflecting the legs further radially inwardly and out of engagement with the locating means to permit the biting teeth to freely move relative to the wheel flange until the locking teeth engage the tire bead and the biting teeth concomitantly engage the wheel flange, the legs resiliently retaining the teeth in engagement with the wheel to retain the cover on the wheel, and means on the cover body axially backing up the legs during installation of the cover.

4. In combination with a vehicle wheel having an annular axially extending flange, a wheel cover comprising, a cover body having a pair of circumferentially extending radially spaced flange means, a wheel cover retainer insertable between the flange means and including a body portion seating on one flange means and a return bent locking portion removably locked between the cover body and the other flange means to removably secure the retainer to the flange means, spaced rib means on the other flange means engageable with spaced edge portions of the locking portion to resist rotation of the retainer relative to the cover, the retainer including a pair of cantilever legs, each extending from a circumferentially respective side of the body portion and coplanar therewith, means on the terminal portion of each leg engageable with the wheel flange to retain the cover on the wheel, circumferentially spaced axial ribs on the cover body engageable by the legs to deflect such legs radially inwardly into arcuate shape and position the terminal portions of the legs in interfering relationship to the wheel flange in the uninstalled position of the cover, the engagement of the terminal portions with the wheel flange upon installation of the cover deflecting the legs further radially inwardly and out of engagement with the locating means to a resilient cantilever position to resiliently retain the cover on the wheel, and radial ribs on the cover body axially engageable by the legs to axially back up the legs upon engagement of the terminal portions with the wheel flange during installation of the cover.

* * * * *